United States Patent [19]
I et al.

[11] Patent Number: 5,737,326
[45] Date of Patent: Apr. 7, 1998

[54] MULTI-CODE CODE DIVISION MULTIPLE ACCESS RECEIVER

[75] Inventors: Chih-Lin I, Manalapan Township, Monmouth County; Andrzej Partyka, Bedminster Township, Somerset County; Charles Albert Webb, III, Rumson Township, Monmouth County, all of N.J.

[73] Assignee: Lucent Technologies Inc., Murray Hill, N.J.

[21] Appl. No.: 678,834

[22] Filed: Jul. 12, 1996

[51] Int. Cl.[6] .............................. H04B 7/216; H04J 13/04
[52] U.S. Cl. ..................................... 370/335; 370/342
[58] Field of Search .................................. 370/208, 209, 370/320, 335, 342, 441, 479, 468; 375/200, 206, 208, 349

[56] References Cited

U.S. PATENT DOCUMENTS

| | | | |
|---|---|---|---|
| 5,291,515 | 3/1994 | Uchida et al. | 375/200 |
| 5,365,544 | 11/1994 | Schilling | 370/342 |
| 5,373,502 | 12/1994 | Turban | 370/441 |
| 5,490,165 | 2/1996 | Blakeney, II et al. | 370/335 |
| 5,596,571 | 1/1997 | Gould et al. | 370/335 |

*Primary Examiner*—Chau Nguyen

[57] ABSTRACT

A Multi-Code (MC) Code Division Multiple Access (CDMA) receiver receives N (where N>1) encoded signal channels over multiple air signal paths. In the MC-CDMA receiver, once a timing correlator means has recovered the timing and control signals for the data signal received over any particular signal path, those timing and control signals are utilized by each of the N data (second type) correlator means for decoding and despreading an associated one of the N data signal channels received over that path.

14 Claims, 6 Drawing Sheets

MULTI-CODE CODE DIVISION MULTIPLE ACCESS RECEIVER

FIELD OF THE INVENTION

This invention relates to Multi-Code (MC) Code Division Multiple Access (CDMA) receivers and, more particularly, to a MC-CDMA receiver which shares recovered timing and control signals among a plurality of data correlator circuits

BACKGROUND OF THE INVENTION

Code Division Multiple Access (CDMA) has gained significant attention in recent years as the up and coming technology for wireless networks. In spite of a multitude of advantages this technology offers, conventional CDMA systems have very limited user throughput and are not well suited to "bandwidth on demand" multimedia applications. In fact, current CDMA standards, i.e., International Standard (IS)-95, operate in circuit mode, assume a homogeneous user population, and limit each user to a rate which is a very small fraction of the system capacity.

It has been recognized that wireless data rates in the range of 56 to 64 Kbps are of great importance and interest. Not only is it well above the 19.2 Kbps rate CDPD (Cellular Digital Packet Data) provides, but also it can match the public switched packet data network, i.e., X.25, rate. With the availability of the mobile video telephone coder at 28.8 Kbps, H.324m, a true multimedia connection can be enabled at 56 Kbps. Moreover, many multimedia applications such as Internet surfing over a wide area wireless network may require asymmetric throughput, e.g., the forward link may require a higher data rate than the reverse link.

A Multi-Code CDMA (MC-CDMA) system was proposed and is the subject of U.S. Pat. No. 5,442,625, entitled "Code Division Multiple Access System Providing Variable Data Rate Access To A User," issued on Aug. 15, 1995. This patent describes a packet-based wireless network that accommodates multimedia traffic in any CDMA-based system, and is a system that can evolve from IS-95 cellular/Personal Communications Services (PCS) systems. To combat the potentially large intercell interference variations caused by high data rate users in such a system, a demand assignment access scheme, called LIDA (Load and Interference based Demand Assignment) has also been proposed to work naturally with MC-CDMA enhanced IS-95.

Unfortunately the additional data channels utilized in such MC-CDMA systems requires increased circuitry and the resulting increased cost and power consumption at both the transmitter and receiver locations. Increases in cost and power consumption is of particular concern for mobile terminals.

SUMMARY OF THE INVENTION

In accordance with the present invention, we have reduced the circuitry and associated cost and power consumption of a Multi-Code (MC) Code Division Multiple Access (CDMA) receiver for receiving N (where N>1) encoded signal channels over multiple air paths. In our MC-CDMA receiver, once a timing (first type) correlator means has recovered the timing and control signals for the data signal received over any particular signal path, those timing and control signals are utilized by each of the N data (second type) correlator means for decoding and despreading an associated one of the N data signal channels received over that path.

According to other features of the invention, the receiver may operate with signals encoded using mutually orthogonal codes or non-orthogonal codes. The receiver may operate in a coherent mode (illustratively, using Walsh encoded or other types of signals) or in a non-coherent mode (illustratively, using a user Long PN code via subcode concatenation or other types of signals).

In one embodiment the receiver is used in a system having a forward link which uses orthogonal signals in a coherent mode while the reverse link uses orthogonal signals in a non-coherent mode.

DETAILED DESCRIPTION

Figure 1:
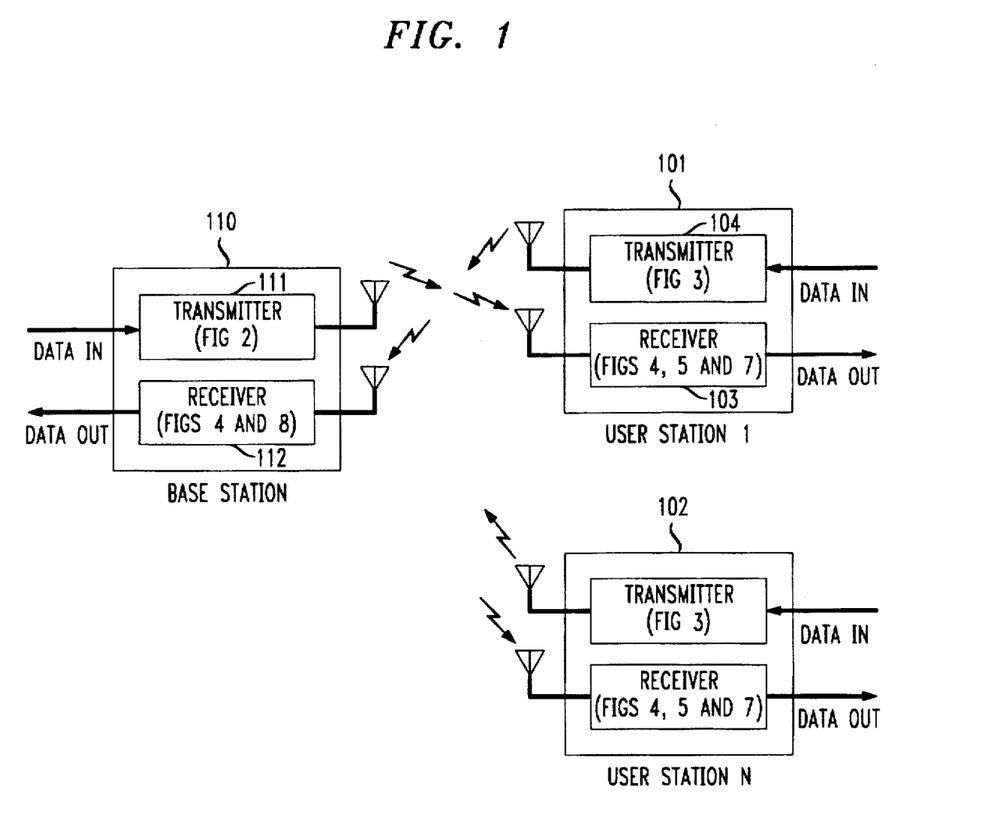
FIG. 1 shows a typical MC-CDMA system useful in explaining the operations of the present invention.

With reference to FIG. 1, we describe a typical MC-CDMA system in which the present invention may be utilized. The system includes a plurality of mobile user stations (1–N), shown as 101–102, which enables a plurality of users (1–N) to communicate with a base station unit 110 at one cell site. The base station 110 includes a transmitter 111 for transmitting data in a forward link to each of the user stations 101–102, and a receiver 112 for receiving data in a reverse link from each of the user stations 101–102. Transmitter 111 is implemented as a non-coherent transmitter, as shown in FIG. 2, while receiver 112 is a non-coherent receiver implemented using a combination of the circuits shown in FIGS. 4 and 8.

Each of the user stations 101-102 include a forward link receiver 103 and a reverse link transmitter 104. The Receiver, e.g., 103, is implemented as a coherent receiver implemented using a combination of the circuits shown in FIGS. 4, 5 and 8. The transmitter is implemented as a non-coherent transmitter implemented using the circuit shown in FIG. 3. The air space between the base station 110 and the user stations 101–102 usually provide a multipath environment for both the forward and reverse link communications.

Figure 2:
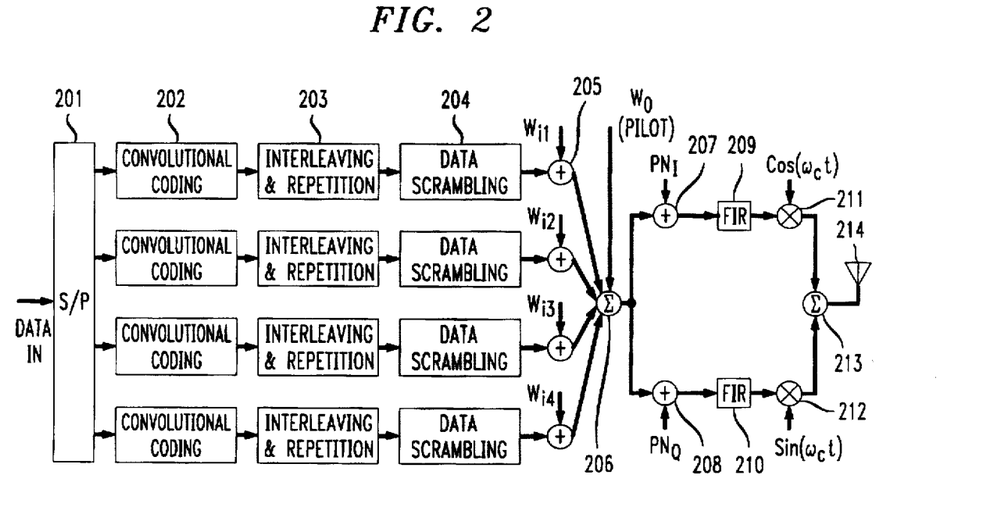
FIG. 2 shows a simplified block diagram of an illustrative four channel MC-CDMA coherent (typically forward link) transmitter that can be used in the system of FIG. 1.

Shown in FIG. 2 is a simplified block diagram of an illustrative four channel MC-CDMA transmitter 111 which may be used at a base station to provide a coherent MC-CDMA link between the base station 110 and the user stations 101–102. Data is received at a serial-to-parallel unit 201 which converts a user's serial digital data input into, illustratively four data streams, each of which is encoded using a convolutional coder, e.g., 202. The output of each convolutional coder is then coupled to an interleaver circuit, e.g., 203, and then to a data scrambler, e.g., 204. The output of each data scrambler is then coupled to a code spreader, e.g., 205, which spreads the data bit rate signal into a channel bit rate using a different one of the Walsh codes $W_{i1}$–$W_{i4}$. A summer or combiner 206 combines the outputs of the code spreaders with a Walsh code pilot signal $W_0$. The Walsh code pilot signal $W_0$ is the signal that is detected at the receiver, e.g., 101, to enable the coherent operation of the forward link.

The output of combiner 206 is coupled to coders 207 and 208. In coder 207, an in-phase code $PN_I$ further encodes the output signal from combiner 206. In coder 208, a quadrature-phase code $PN_Q$ further encodes the output signal from combiner 206. The outputs from coders 207, 208 are each filtered by FIR filters, 209 and 210 respectively. The outputs of the FIR filters 209 and 210 are then up-converted by modulators 211 and 212 using radio carrier frequency signals $\cos(\omega_c t)$ and $\sin(\omega_c t)$, respectively. The output of modulators 211 and 212 are radio frequency signals which are combined in combiner 213 and transmitted via antenna 214 over the air to the user stations 101–102.

Figure 3:
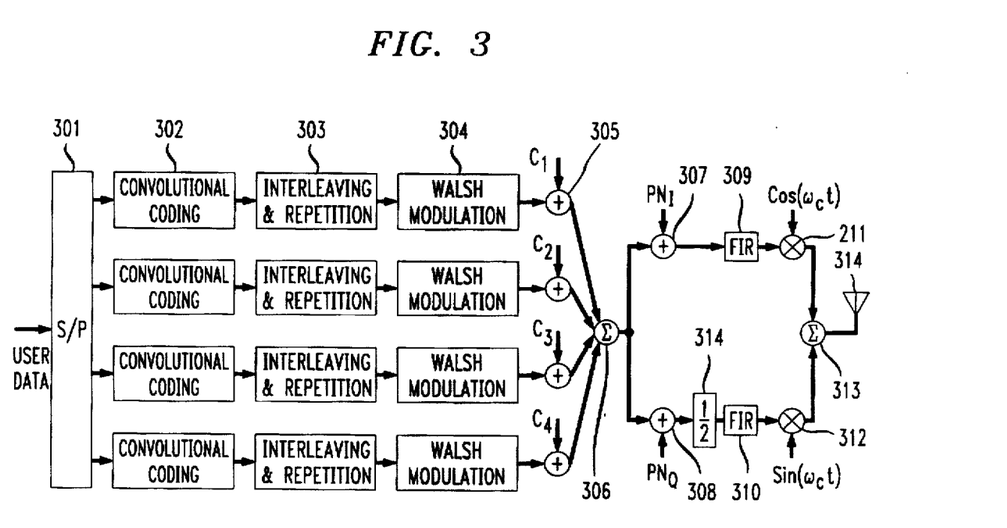
FIG. 3 shows a simplified block diagram of an illustrative four channel MC-CDMA non-coherent (typically reverse link) transmitter that can be used in the system of FIG. 1.

Shown in FIG. 3 is a simplified block diagram of an illustrative four channel MC-CDMA transmitter 111 which, illustratively, is used at user station s 101–102 to provide a non-coherent MC-CDMA link to the base station 110. User data is received at a serial-to-parallel unit 301 which converts a user's serial digital data input into, illustratively four data streams, each of which is encoded using a convolutional coder, e.g., 302. The output of each convolutional coder is then coupled to an interleaver circuit, e.g., 303, and then to a Walsh modulator circuit, e.g., 304. The output of each Walsh modulator circuit is then coupled to a code spreader, e.g., 305, which spreads the data bit rate signal into a channel bit rate using a different one of the codes $C_1$–$C_4$. These codes are derived from the user Long PN code via subcode concatenation. A summer or combiner 306 combines the outputs of the code spreaders which is then coupled to coders 307 and 308. Since no pilot signal is added in combiner 306, transmission is non-coherent in the reverse link.

In coder 307, an in-phase code $PN_I$ further encodes the output signal from combiner 306. In coder 308, a quadrature-phase code $PN_Q$ further encodes the output signal from combiner 306. The output from coder 307 is filtered by FIR filter 209. The output from coder 308 is divided in half by divider 314 and then filtered by FIR filter 210. The outputs of the FIR filters 309 and 310 are then up-converted by modulators 311 and 312 using radio frequency signals $\cos(\omega_c t)$ and $\sin(\omega_c t)$, respectively. The output of modulators 311 and 312 are radio frequency signals which are combined in combiner 313 and transmitted via antenna 314 over the air to the user stations 101–102.

For both the forward link of FIG. 2 and the reverse of FIG. 3 there is no self-interference for a given multipath component because both the Walsh codes and the subcodes are mutually orthogonal.

Figure 4:
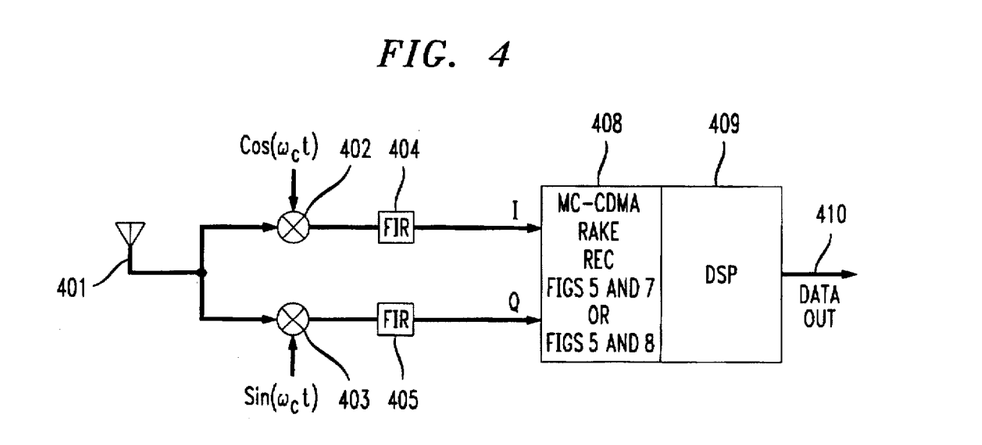
FIG. 4 shows a simplified block diagram of an illustrative four channel MC-CDMA receiver that can be used in the system of FIG. 1.

FIG. 4 shows a simplified block diagram of an illustrative four channel MC-CDMA receiver that can be used at the base station 110 or at any of the user stations 101–102 of the system of FIG. 1. The radio frequency signals received via antenna 401 are down-converted by modulators 402 and 403, using radio frequency signals $\cos(\omega_c t)$ and $\sin(\omega_c t)$, respectively. The output of demodulators 402 and 403 are each filtered by an anti-aliasing LPF (Low Pass Filter) 404 and 405, respectively to produce a resulting baseband I and Q signals. The I and Q signals, are then further decoded and despreaded by a MC-CDMA RAKE receiver 408 operating under control of Digital Signal Processor (DSP) 409 to produce the output data signal 410. The DSP forms a weighted average of each of the data signals received by a different finger, where each finger tracks a different multipath component. A RAKE receiver is an optimum mechanism for receiving signals in a multipath environment.

Our coherent MC-CDMA RAKE receiver for use at the user stations 101–102 102, as will be discussed in more detail in later paragraphs, may be implemented by a combination of the circuits of FIGS. 5 and 7. Our non-coherent MC-CDMA RAKE receiver for use at the base stations 110, as will be discussed in more detail in later paragraphs, may be implemented by a combination of the circuits of FIGS. 5 and 8.

Before we discuss the embodiment of our MC-CDMA RAKE receiver, we first review the operations of a prior art CDMA RAKE receiver. A RAKE receiver is an optimum mechanism for receiving signals in a multipath environment. An illustrative example of a receiver is described in the following references 1) "A Communication Technique for Multipath Channels" by R. Price and P. E. Green Jr.; Proceedings IRE, Vol. 46, Pages 555–570, March, 1958

2) "Introduction to Spread Spectrum Anti-multipath Technique and Their Applications to Urban Digital Radio" by G. L. Turin; Proceedings IEEE, Vol. 68, No. 3, Pages 328–353, March, 1980

3) "Digital Communications" by J. G. Proakis; McGraw-Hill, 1989

Figure 5:
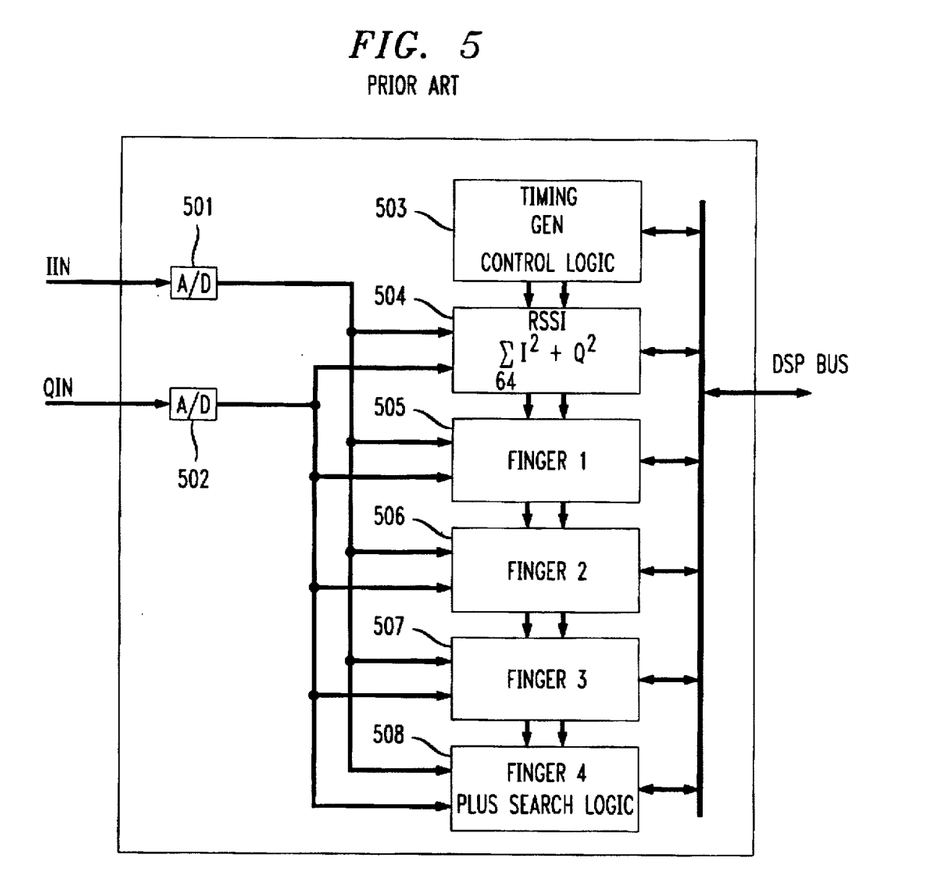
FIG. 5 shows a prior art "RAKE" receiver for a CDMA system.

FIG. 5 shows an illustrative block diagram of a prior art "RAKE" receiver typically use in a CDMA system. A RAKE receiver is used in both the forward and reverse links of a CDMA system to take advantage of the inherent time diversity in the received signals arriving via different paths of a multipath environment.

Analog I signals (IIN) and Q signals (QIN) are converted to digital signals by the A/D circuits 501 and 502, respectively. Control logic circuit 503, provides Digital Signal Processor (DSP) interfacing and control, as well as common timing and control functions for the CDMA receiver. Control logic circuit 503 operates under control of signals received over DSP bus from a DSP, not shown. An RSSI (Received Signal Strength Indicator) block 504 calculates the total received signal power of the I and Q signals received over the various signal paths.

In the RAKE receiver, there are several mostly identical "finger" units 505–508. Each of the finger units 505–508 is used to despread/demodulate a received signal arriving over a different air path of the multipath environment. These finger units 505–508 are essentially the same except they have a different time delay, attenuation and phase characteristics. The finger unit 508 additionally includes a small amount of additional logic to allow its use as a high-speed pilot searcher (for use in coherent receivers to detect the Walsh signal pilot $W_0$, as shown in FIG. 2) and/or new data path searchers (for use in a non-coherent receiver to recover timing from a data signal).

In accordance with the present invention, the CDMA RAKE receiver of FIG. 5 is adapted to provide a MC-CDMA receiver as follows. Much of the search logic in finger unit 507, the RSSI block 504, and much of the common control logic 503 is unchanged. The finger units 505–508, which are used for the reception of data for each of the different data paths, are each modified in the same manner for use in the MC-CDMA receiver. The DSP bus is used to distribute the data signals from finger units 505–508 and control logic circuit 503 to the DSP (not shown).

We have observed that for the MC-CDMA enhanced IS-95 forward link, all of the N Walsh channels received on a single 1.25 MHz wide CDMA carrier ($\omega_c$ of FIG. 2) over the same air path arrive simultaneously. Consequently, a single finger unit tracking a pilot signal of a given multipath component acquires all of the timing necessary to despread all of the other N–1 Walsh channels processed by that finger unit. Therefore the problem of pilot tracking and acquisition is not exacerbated by having to receive N Walsh channels simultaneously.

Similarly for the MC-CDMA enhanced IS-95 reverse link, all subcodes from a single user mobile station (e.g., 101) received over a particular air path are received simultaneously at the base station, so that it is only necessary for the base station to track and acquire timing information for a single reverse channel subcode. This timing information can then be used to control the reception of and despreading of all of the remaining N–1 subcodes from a given user mobile station. It is important to note that the same observation holds true in general for any coherent or non-coherent receiver of any MC-CDMA system.

Figure 6:
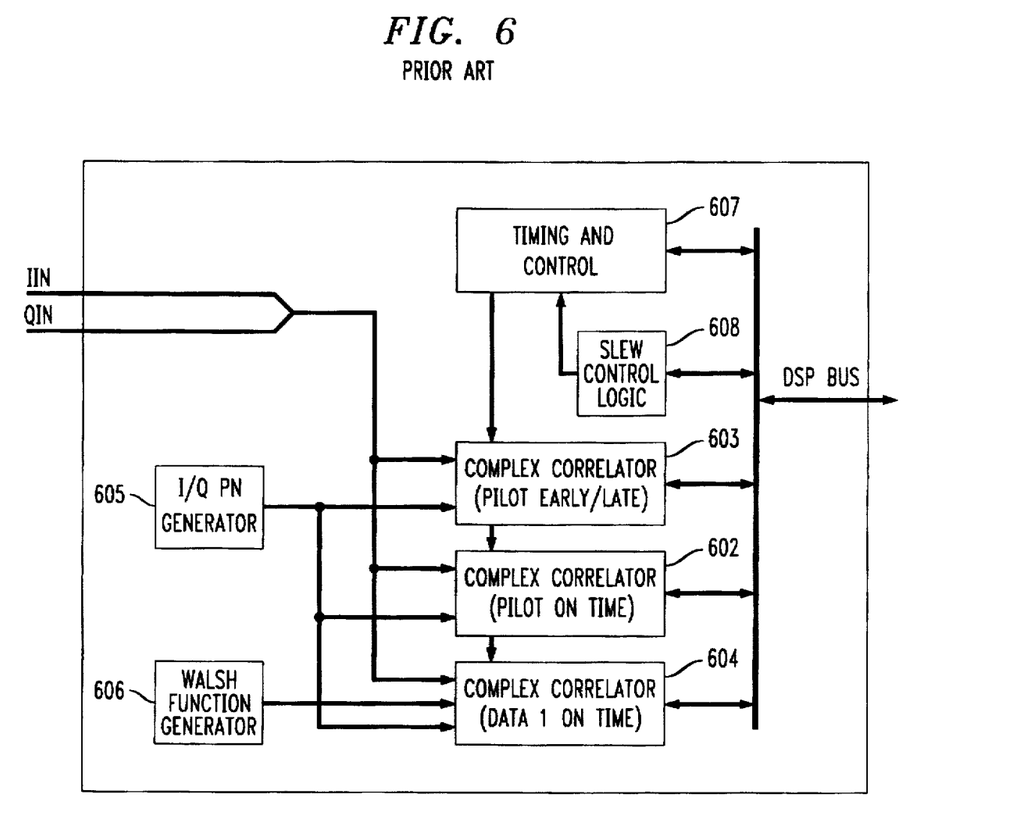
FIG. 6 shows a prior art RAKE finger architecture for a coherent CDMA system.

FIG. 6 shows a typical embodiment of a RAKE finger for a coherent CDMA receiver for use in a IS-95 forward link. A basic IS-95 RAKE finger in a coherent CDMA receiver has three complex correlators, one for detecting pilot on-time 602, one for detecting pilot early/late 603 and one for data-on-time 604 (which together recover the timing signals). This arrangement allows the decoding and despreading of data on a single Walsh channel by data complex correlator 604. The data output of correlators 60–604 are then outputted over DSP bus to a DSP unit, not shown.

The I/Q PN generator 605 provides input codes to the correlators 602–604. The Walsh function generator 606 provides a Walsh code to the data correlator 604. Control circuit 607 and slew control logic 608 provide control signals for the operation of the RAKE finger and also interface to the DSP bus.

In accordance with the present invention, the RAKE finger unit of FIG. 6 is adapted for use in a MC-CDMA receiver having N simultaneous Walsh channels by adding N–1 additional complex correlators 604 to each finger, one for each additional Walsh data channel being received.

Figure 7:
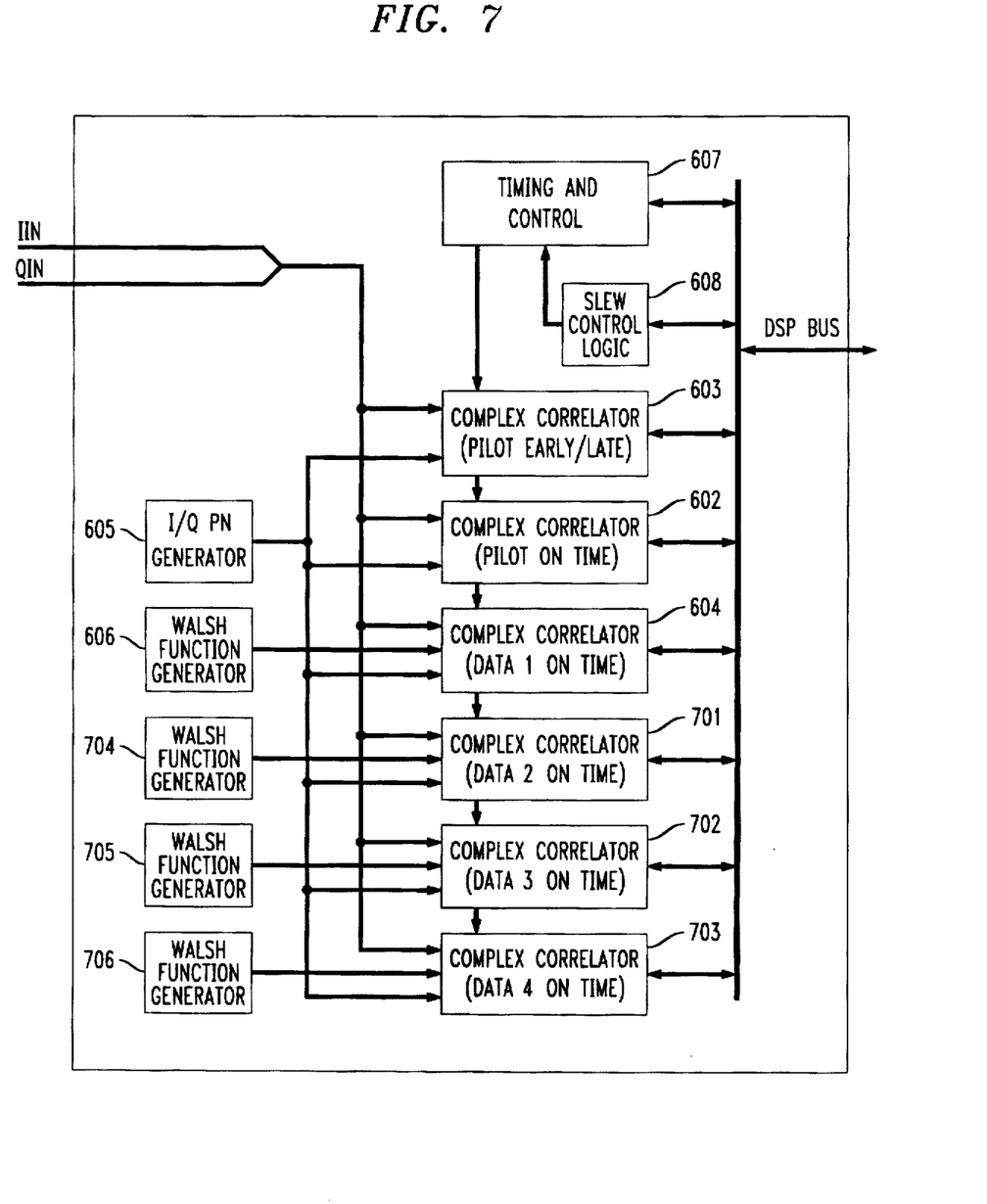
FIG. 7 shows a "Fat Finger" architecture for an illustrative four channel coherent MC-CDMA receiver for use in the system in FIG. 1.

With reference to FIG. 7, the additional correlators are 701–703 and each correlator has its own Walsh function generator 704–706, respectively. Since N in our example is equal to four, three additional correlators 701–703 are added to the original correlator 604, as shown in FIG. 7. Each of the data-on-time complex correlators 604,701–703 is used to decode and despread the data on a different channel using the same recovered timing information.

We refer to the design shown in FIG. 7 as a "Fat Finger" because it is similar to a single-channel finger, differing only in the number of data-on-time correlators utilized. For a MC-CDMA system having N channels (for supporting N times the basic rate), the Fat Finger design saves 2 (N–1) complex correlators over the number of complex correlators that would be required by utilizing the prior art MC-CDMA receiver design. Note that our Fat Finger design is not limited to having four complex data correlators as shown in FIG. 7, but will depend on the maximum number of forward channels N used in a particular MC-CDMA system implementation.

Additionally, our design allows for the possibility that the forward channel may contain independent information in the received I and Q channels. In that case, a slightly different complex correlator may be used to distinguished the data on the I and Q channels independently, thus further doubling the user data rate. The Fat Finger design applies to such a configuration because the timing of the received I and Q channels is the same. Thus, for example, if each of the N channels use I and Q channels, and N=4, then all eight correlators can use the same recovered timing signals. For this reason, many possible enhanced CDMA systems can benefit from our Fat Finger design.

Figure 8:
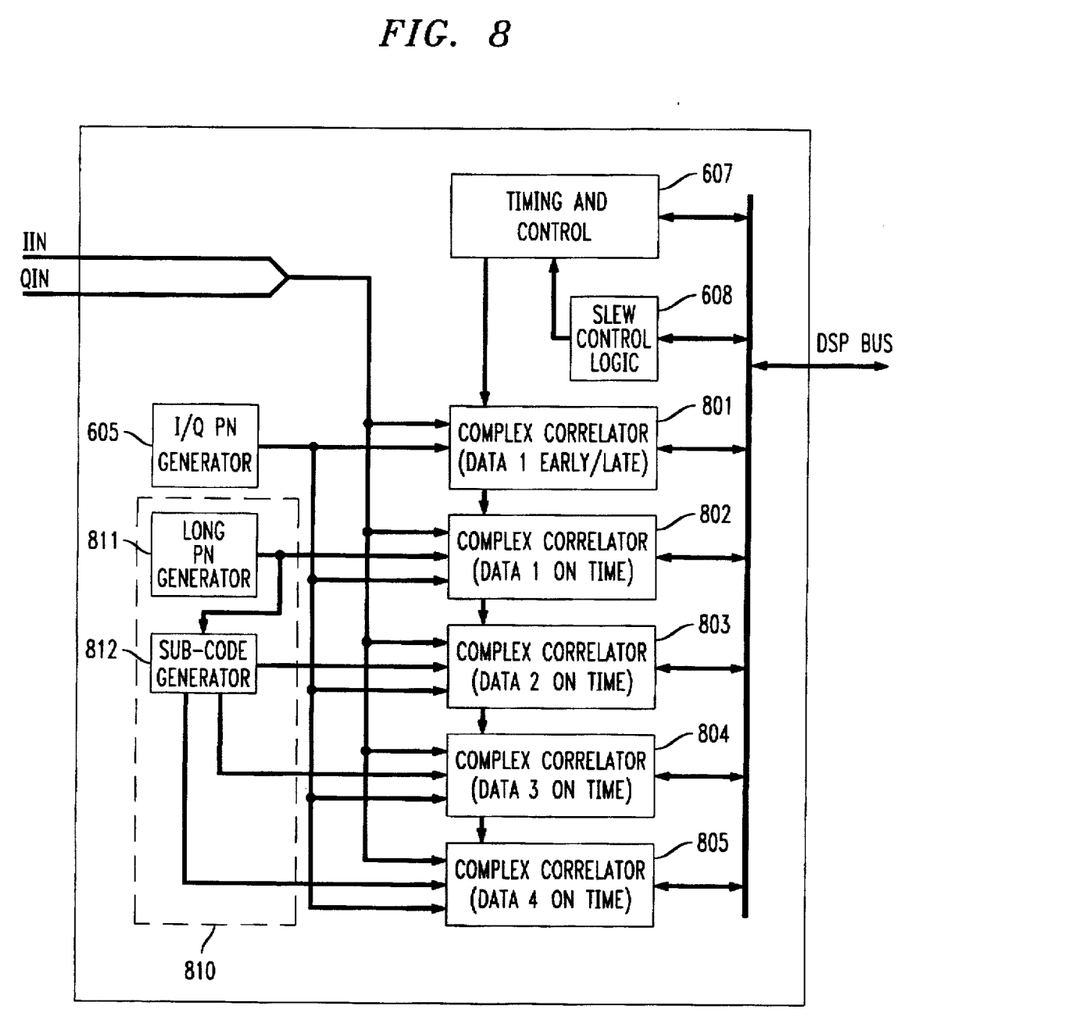
FIG. 8 shows a "Fat Finger" architecture for an illustrative four channel non-coherent MC-CDMA receiver for use in the system in FIG. 1.

For a non-coherent MC-CDMA receiver typically used in the reverse link (e.g., at the base station), a similar situation holds. In this case, as shown in FIG. 8, because there is no pilot signal, the receiver is non-coherent and timing is derived directly from the data signal. A typical prior art IS-95 CDMA reverse link RAKE receiver utilizes only two complex correlators, 801 and 802, in each finger.

With reference to FIG. 8 the complex correlators include a data early/late correlator 801 and a data-on-time correlator 802. Using our inventive notion of sharing common logic and control, it suffices, for the MC-CDMA receiver, to add one additional data-on-time complex correlator 803–805 for each additional code. In this case, the Fat Finger design saves N–1 complex correlators per user. The non-coherent MC-CDMA receiver shown in FIG. 8 supports N=4 channels. Note that for this receiver channelization can be achieved either through subcodes concatenation (as shown by 810, 811 and 812) or through simple aggregation of Long PN codes (i.e., by using a separate Long PN generator 811 for each complex correlator 802–805). Note also, that if the base station already has multiple RAKE fingers available to serve multiple users at the basic rate, then simple aggregation may suffice for MC-CDMA.

While our inventive MC-CDMA receiver has been described for use in a forward link utilizing a Walsh code pilot frequency and Walsh encoding to provide coherent operation, it should be noted that many other well known codes which maintain coherent operations may also be utilized in both the MC-CDMA transmitter and MC-CDMA receiver (typically in the forward link). Similarly, while our MC-CDMA receiver has been described for use in a non-coherent reverse link utilizing a user Long PN code via subcode concatenation, it should be noted that many other well known codes which provide non-coherent operations may also be utilized in both the MC-CDMA transmitter and MC-CDMA receiver (typically in the reverse link). Moreover, changing the operation of the forward link and reverse link from coherent and non-coherent, respectively, to non-coherent and coherent, does not affect the operation of the receivers.

Additionally, while our MC-CDMA receiver has been described for use in forward and reverse link systems which utilize mutually orthogonal signal codes, it should be understood that our invention may also be used in forward and reverse link systems which use non-orthogonal signal codes.

While in the figures, the complex correlators (typically including exclusive- or gates and an accumulator) are shown as separate entities, it is also possible that other embodiments of this invention may achieve further sharing of logic circuitry among multiple correlators (e.g., the addition operation of the accumulator may be time-shared).

What has been disclosed is merely illustrative of the present invention. Other arrangements can be implemented by those skilled in the art without departing from the spirit and scope of the present invention.

We claim:

1. A multicode (MC) code division multiple access (CDMA) receiver comprising
   rake receiver means for receiving a MC-CDMA signal including N where N>1, encoded complex data signal channels, each complex data signal channel being different from any other complex data signal channel,
   first correlator means for tracking and acquiring timing information for a preselected one of the N encoded complex data signal channels of the MC-CDMA signal, and
   a plurality of second correlator means, each second correlator means utilizing said acquired timing information for decoding and despreading an associated one of the N encoded complex data signal channels.

2. The MC-CDMA receiver of claim 1 wherein said plurality of second correlator means is equal to N.

3. The MC-CDMA receiver of claim 1 wherein at least two of the N encoded complex data signal channels are mutually orthogonal encoded complex data signal channels.

4. The MC-CDMA receiver of claim 1 wherein the N encoded complex data signal channels use multiple user Long PN codes which are not mutually orthogonal.

5. The MC-CDMA receiver of claim 3 wherein the mutually orthogonal encoded signal channels are encoded using Walsh codes.

6. The MC-CDMA receiver of claim 3 wherein the mutually orthogonal encoded signal channels are encoded using user Long PN codes.

7. The MC-CDMA receiver of claim 5 wherein a Long PN code generator and a subcode generator are used to generate the N codes to decode the N encoded complex data signal channels.

8. The MC-CDMA receiver of claim 1 wherein said plurality of second correlator means includes N−1 second correlator circuits, one for each of the N encoded complex data signal channels except for the preselected channel.

9. The MC-CDMA receiver of claim 1 wherein said first correlator means and said plurality of second correlator means utilize complex correlators to decode its associated encoded complex data signal channel.

10. The MC-CDMA receiver of claim 1 wherein said first correlator means operates in a coherent mode.

11. The MC-CDMA receiver of claim 1 wherein said first correlator means operates in a non-coherent mode.

12. The MC-CDMA receiver of claim 1 being part of a user station of a MC-CDMA system including at least one base station and a plurality of user stations.

13. The MC-CDMA receiver of claim 1 being part of a base station of a MC-CDMA system including at least one base station and a plurality of user stations.

14. A method of operating a multicode (MC) code division multiple access (CDMA) receiver comprising the steps of:
   receiving a MC-CDMA signal including N, where N>1, encoded complex data signal channels at a rake receiver, each complex data signal channel being different from any other complex data signal channel,
   tracking and acquiring timing information for a preselected one of the N encoded complex data signal channels of the MC-CDMA signal at a first correlator means and
   decoding and despreading an associated one of the N encoded data signal channels at each of a plurality of second correlator means by utilizing said acquired timing information.

* * * * *